United States Patent
Reeb

(10) Patent No.: US 9,102,377 B2
(45) Date of Patent: Aug. 11, 2015

(54) SADDLE OF BICYCLE

(71) Applicant: UNIVERSAL TRIM SUPPLY CO., LTD., New Taipei (TW)

(72) Inventor: David Lee Reeb, New Taipei (TW)

(73) Assignee: Universal Trim Supply Co., Ltd., New Taipei (TW)

( * ) Notice: Subject to any disclaimer, the term of this patent is extended or adjusted under 35 U.S.C. 154(b) by 0 days.

(21) Appl. No.: 14/220,147

(22) Filed: Mar. 20, 2014

(65) Prior Publication Data

US 2014/0203601 A1 Jul. 24, 2014

Related U.S. Application Data

(63) Continuation-in-part of application No. 13/421,880, filed on Mar. 16, 2012, now abandoned.

(30) Foreign Application Priority Data

Oct. 24, 2011 (CN) .......................... 2011 1 0325284

(51) Int. Cl.
*B62J 1/00* (2006.01)
*B62J 1/08* (2006.01)

(52) U.S. Cl.
CPC .... *B62J 1/08* (2013.01); *B62J 1/00* (2013.01); *B62J 1/007* (2013.01)

(58) Field of Classification Search
CPC ......................................................... B62J 1/00
USPC .................................. 297/195.1, 195.11, 197
See application file for complete search history.

(56) References Cited

U.S. PATENT DOCUMENTS

| | | | |
|---|---|---|---|
| 512,008 A * | 1/1894 | Cavanaugh | 297/215 |
| 3,874,730 A * | 4/1975 | Marchello | 297/452.63 |
| 4,848,712 A * | 7/1989 | Russell | 248/155.2 |
| 5,188,422 A * | 2/1993 | Montgomery | 297/195.1 |
| 5,597,202 A * | 1/1997 | Andersen | 297/195.1 |
| 6,142,562 A * | 11/2000 | Varan | 297/201 |
| 7,506,925 B2 * | 3/2009 | Rutherford | 297/195.1 |
| 7,594,696 B2 * | 9/2009 | Girard | 297/195.11 |
| 7,740,308 B2 * | 6/2010 | Mishly | 297/17 |

* cited by examiner

*Primary Examiner* — Peter Brown
(74) *Attorney, Agent, or Firm* — Leong C. Lei

(57) ABSTRACT

A bicycle saddle includes a saddle frame. A support cloth is mounted atop the saddle frame in a stretched manner. The saddle frame has at least three support spots to couple to edges of the support cloth. A middle portion of the support cloth is located above the saddle frame in a suspended manner. The bicycle saddle is composed of a saddle frame and a support cloth that is arranged above the saddle frame in a suspended manner. The suspension arrangement of the support cloth makes the hips of a rider in engagement with the support cloth rather than contacting the saddle frame. This makes riding comfortable. Further, the support cloth is of excellent performance of heat dissipation thereby reducing the adverse effect on the body health caused by the heat accumulation during riding a bicycle. The left and right frame members are foldably coupled to the bottom base.

2 Claims, 3 Drawing Sheets

SADDLE OF BICYCLE

CROSS-REFERENCE TO RELATED APPLICATION

This is a continuation-in-part of co-pending U.S. patent application Ser. No. 13/421,880 filed on Mar. 16, 2012 and owned by the present applicant. A counterpart British application of the parent application, designated with Application No. GB 1204809.6 was recently granted a British patent.

TECHNICAL FIELD OF THE INVENTION

The present invention generally relates to the field of bicycle products, and more particularly to an improved saddle of a bicycle.

DESCRIPTION OF THE PRIOR ART

Conventionally, a bicycle saddle is composed of a cover layer and a saddle frame. The cover layer is set over the saddle frame. During bicycle riding, the hips of a rider are supported on the cover. For long term riding, the hips are kept in contact with the rigid saddle frame in an extended period of time and this makes the hips uncomfortable. Further, the long-term contact of the hips with the cover layer causes accumulation of heat around the hips for the cover layer is often poor in dissipating heat and this is adverse to the health of human body. Further, the conventional saddle frame is not light enough in weight and is not foldable.

SUMMARY OF THE INVENTION

The primary object of the present invention is to overcome the above problem of the prior art by providing an improved saddle of bicycle, wherein the bicycle saddle comprise a piece of support cloth that is mounted on a saddle frame in a suspended manner to provide improved comfortableness for bicycle riding. Further, the saddle of the present invention has a simple and light-weighted structure and is foldable, making it convenient and practical.

To achieve the above object, the present invention adopts the following technical solution:

The present invention provides a bicycle saddle, which comprises a saddle frame and a support cloth that is mounted on the saddle frame in a stretched manner. The saddle frame comprises at least three support spots that are coupled to edges of the support cloth. The support cloth has a middle portion that is arranged on the saddle frame in a suspended manner.

As a further improvement of the above technical solution, the saddle frame comprises a bottom base and a left frame member and a right frame member that are movably coupled to the bottom base and are foldable. The bottom base is movably hinged (pivoted) to the left frame member and the right frame member through hinge pins (pivot pins).

The left frame member and the right frame member are arranged symmetric with respect to a center axis of the base chassis. The left frame member and the right frame member each include a pair of arcuate spaced leg members joined at their top and bottom ends by cross members. The support cloth has opposite edges that are coupled to corresponding edges of the left and right frame members. The left frame member and the right frame member each have an inside end forming a hinge section. The left frame member and the right frame member each have an outside end forming an extended section having an outer edge forming a fitting slot. The fitting slots each define an inclination angle θ with respect to the center axis of the bottom base to which the frame members are pivotally coupled.

The bottom base has a front end to which an upward-curved and frontward-projecting extension piece is mounted. The extension piece has an uppermost end portion that is connected to the support cloth.

The support cloth is a bat wing shape fabric. The support cloth has a front end forming a pocket and the pocket is fit over the extension piece for connection therewith.

Compared to the prior art, the present invention provides the following beneficial advantages:

(1) The bicycle saddle provided by the present invention is composed of a saddle frame and a support cloth that is arranged above the saddle frame in a suspended condition. Since the support cloth is suspended, the hips of a rider can be kept from directly contacting the saddle frame and is instead put in contact with the stretchable support cloth and the riding comfortableness can be greatly improved. Further, the heat dissipation performance is excellent, thereby reducing the adverse influence on the rider's health caused by accumulation of heat during long-term bicycle riding.

(2) In the present invention, movable pivotal joint is formed between the left and right frame members and the bottom chassis of the saddle frame, whereby when not in use, the left frame member and the right frame member can be folded to reduce the overall size.

(3) The bicycle saddle according to the present invention has a structure that is simple and light-weighted and has a beautiful outside appearance.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
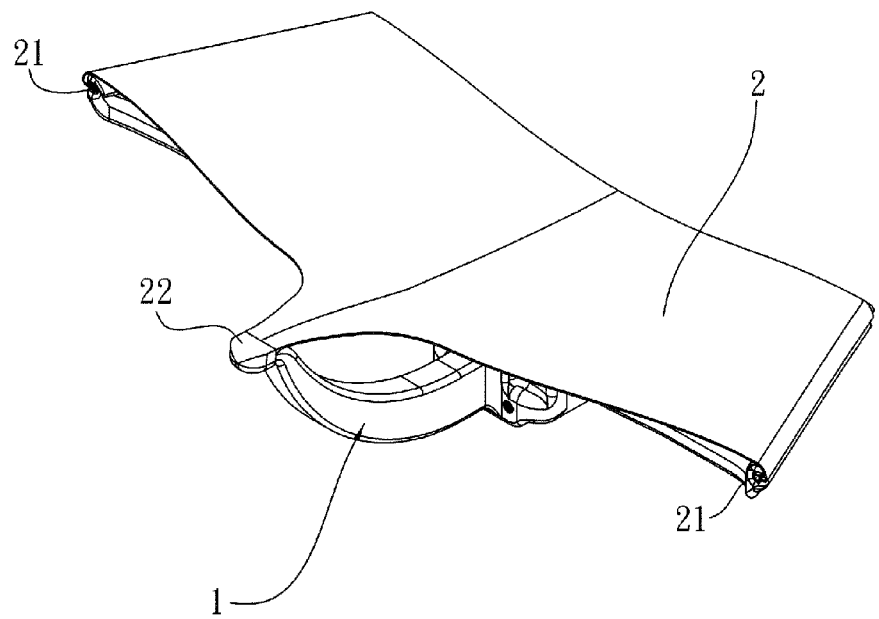
FIG. 1 is a perspective view showing a bicycle saddle according to the present invention in an expanded condition.
Figure 2:
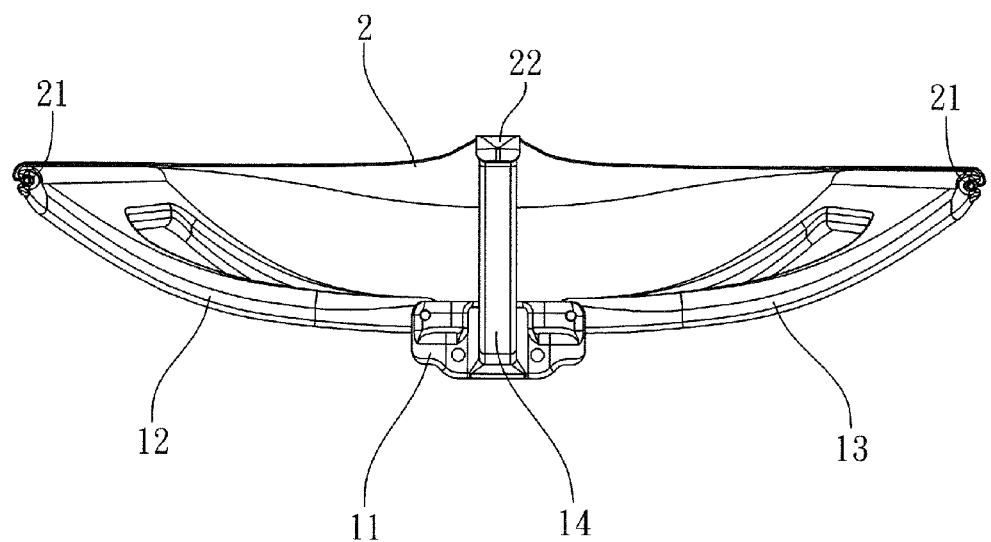
FIG. 2 is a front view of the bicycle saddle of the present invention in a expanded condition.
Figure 3:
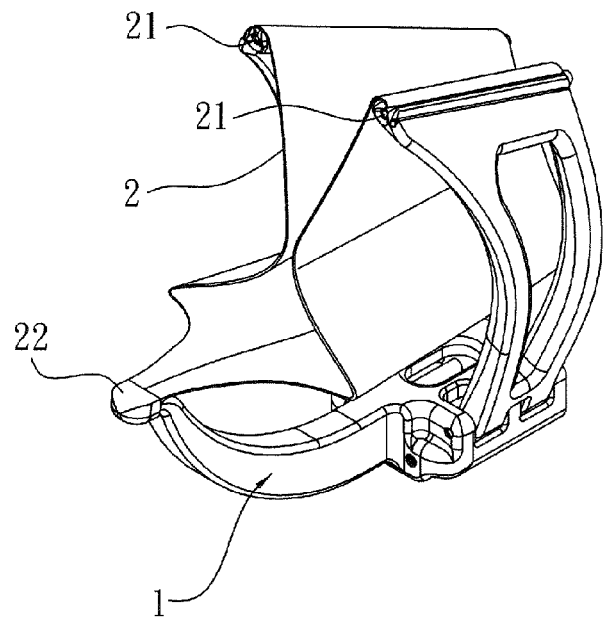
FIG. 3 is a perspective view showing the bicycle saddle of the present invention in a folded condition.

As shown in FIGS. 1-3, the present invention provides an improved saddle of a bicycle, which comprises a saddle frame 1. A support cloth 2, which is properly stretched, is mounted to a top side of the saddle frame 1. The saddle frame 1 comprises at least three support spots coupled to edges of the support cloth 2 in such a way that a middle portion of the support cloth 2 is mounted on the saddle frame 1 in a suspended manner.

Figure 4:
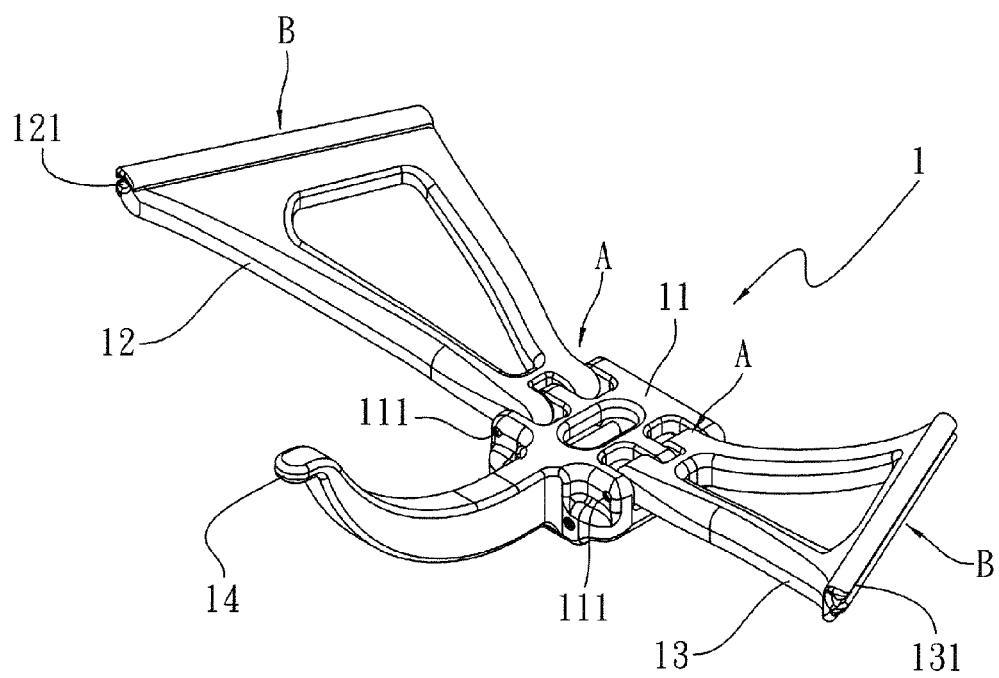
FIG. 4 is a perspective view showing a saddle frame according to the present invention in an expanded condition.
Figure 5:
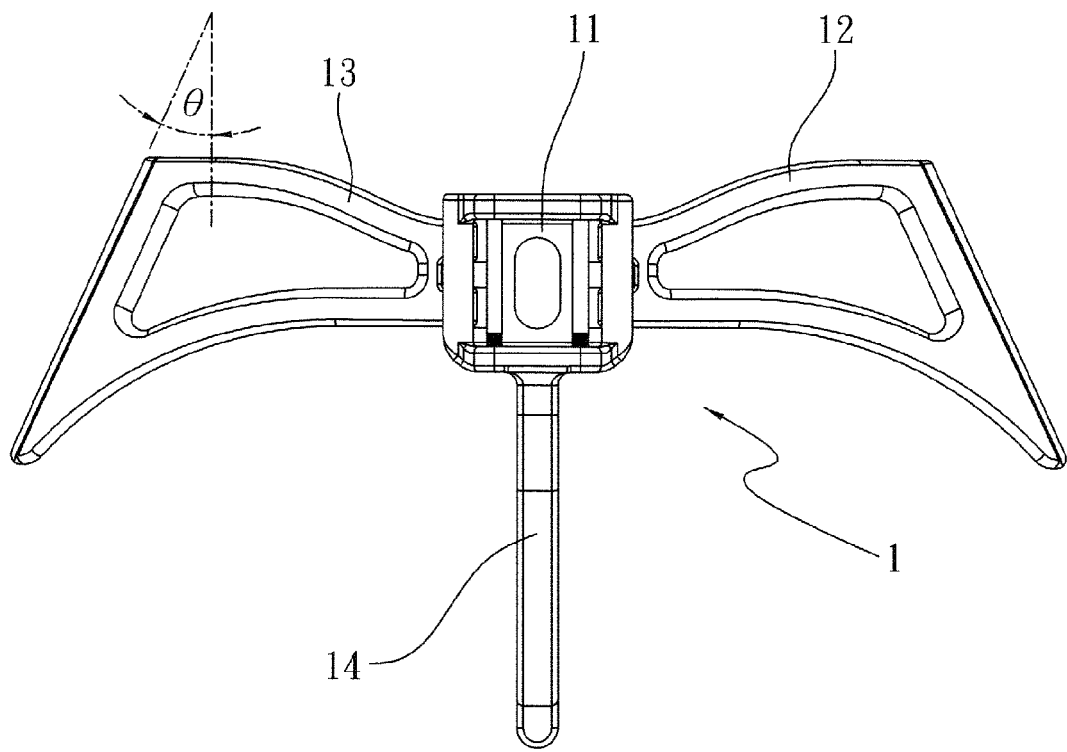
FIG. 5 is a top plan view of the saddle frame according to the present invention in an expanded condition.
Figure 6:
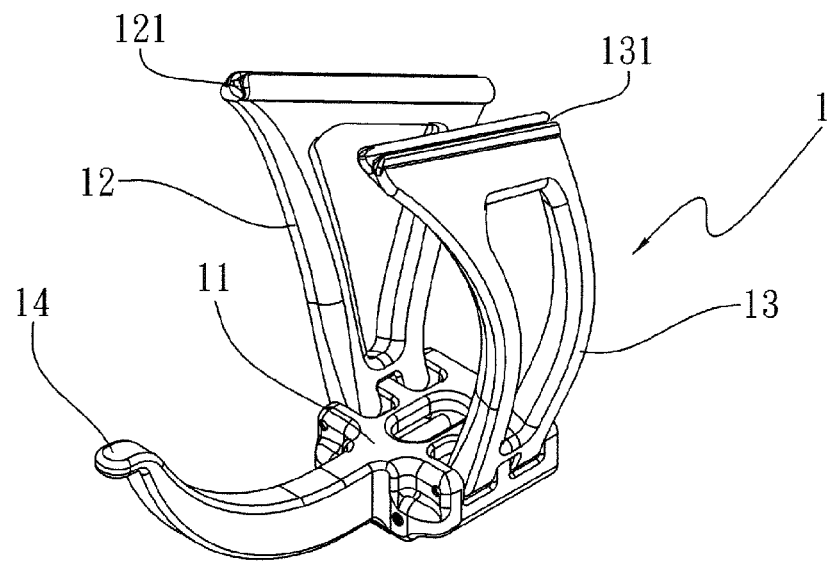
FIG. 6 is a perspective view showing the saddle frame according to the present invention in a folded condition.

As shown in FIGS. 4-6, the saddle frame 1 comprises, structurally, a bottom base 11, a left frame member 12, and a right frame member 13. The left frame member 12 and the left frame member 13 are each provided, at an inside end thereof, with a hinge section A. The left frame member 12 and the right frame member 13 each have an outside end forming an extended section B having an outer edge in which a fitting slot 121, 131 is formed in such a way that the fitting slot 121, 131 defines an inclination angle θ (see FIG. 5) with respect to a center axis of the bottom base 11 to which the frame members are pivotally coupled. Thus, movable coupling is present between the left frame member 12 and the bottom base 11 and is also present between the right frame member 13 and the bottom base 11 so as to allow the frame members to fold with respect to the bottom base. The bottom base 11 is coupled, at a bottom position thereof, to the left frame member 12 and the right frame member 13 in a movable and hinged coupling through hinge pins (namely pivot pins 111, see FIG. 4).

In the present invention, the left frame member 12 and the right frame member 13 are arranged symmetry with respect to the center axis of the bottom base 11. The left frame member 12 and the right frame member 13 each include a pair of arcuate spaced leg members joined at their top and bottom ends by cross members. Opposite sides of the support cloth 2 are coupled to edges of the left frame member 12 and the right frame member 13. The support cloth 2 can be a piece of fabric having a bat wing shape that is stretchable. The support cloth 2 is provided with fitting bars 21 that are respectively receivable in the fitting slots 121, 131 of the left frame member 12 and the right frame member 13 to securely couple the outer edges of the support cloth 2 to the fitting slots 121, 131. Further, the bottom base 11 has a front end to which an upward-curved and frontward-projecting extension piece 14 is mounted. The extension piece 14 has an uppermost end portion that is connected to the support cloth 2. The support cloth 2 has a front end forming a pocket 22 (see FIG. 3) and connection can be made by fitting the pocket 22 over the extension piece 14. In this way, edges of the support cloth 2 are coupled to edges of the left frame member 12 and the right frame member 13 and the end portion of the extension piece 14 to keep the middle portion of the support cloth 2 normally in a condition not in engagement with the saddle frame 1. Further, since the fitting slots 121, 131 are inclined with respect to the center axis of the bottom base 11, to which they are pivotally coupled, by an angle θ, when the hips of a riders are placed on the support cloth 2, stress of the support cloth 2 is distributed in a linear form along the coupling thereof with the fitting slot 121, 131 and is not concentrated at a single stress concentration point, so that the coupling and durability are both improved.

When a rider rides a bicycle, the rider sits on the support cloth 2 that is suspended in air like a bird flying in the sky. The jump rhythm that is perceived following the movement of the bicycle when the rider is pedaling the bicycle provides such a feeling of easiness and delightfulness that greatly improves the comfortableness of bicycle riding. Further, the support cloth 2 provides an excellent performance of heat dissipation thereby lowering the undesired influence of rider's body health by the accumulation heat during bicycle riding. When not put in use, the saddle of the present invention allows the left frame member 12 and the right frame member 13 to be folded toward the bottom base 11 (see FIGS. 5 and 6) to provide practical convenience of use.

Further, the saddle of the present invention has a structure that is simple and light-weighted and has a beautiful outside appearance.

Further, the saddle frame 1 of the present invention can be made in other shapes and corresponding thereto, the support cloth 2 may be shaped in a complementary manner.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A bicycle saddle, comprising a saddle frame and a support cloth, characterized in that the support cloth is mounted on the saddle frame in a stretched manner, the saddle frame comprising at least three support spots that are coupleable to edges of the support cloth, the support cloth having a middle portion that is arranged on the saddle frame in a suspended manner, the saddle frame comprising a bottom base and a left frame member and a right frame member that are movably coupled to the bottom base and are foldable, the left frame member and the right frame member being arranged symmetric with respect to the center axis of the base chassis, the left frame member and the right frame member each including a pair of arcuate spaced leg members joined at their top and bottom ends by cross-members, the support cloth having opposite edges that are coupled to corresponding edges of the left frame member and the right frame member, wherein the bottom base is movably hinged to the left frame member and the right frame member through hinge pins (pivot pins), the bottom base having a front end forming an upward-curved and frontward-projecting extension piece, the extension piece having an uppermost end portion coupled to the support cloth.

2. The bicycle saddle according to claim 1, characterized in that the support cloth has a bat wing shape and is stretchable.

* * * * *